United States Patent [19]

Sakamoto

[11] 3,821,803

[45] June 28, 1974

[54] VIDEO SIGNAL RECORDING AND REPRODUCING APPARATUS WITH TAPE SPEED CONTROL

[75] Inventor: Hitoshi Sakamoto, Kanagawa, Japan

[73] Assignee: Sony Corporation, Tokyo, Japan

[22] Filed: Oct. 30, 1972

[21] Appl. No.: 301,989

[30] Foreign Application Priority Data

Oct. 29, 1971 Japan .............................. 46-86029

[52] U.S. Cl. .................................... 360/73, 360/33

[51] Int. Cl. ............................................ H04n 5/78

[58] Field of Search....... 178/6.6 A, 6.6 P, 69.5 TV, 178/69.5 DC; 179/100.2 B, 100.2 T, 100.2 S

[56] References Cited

UNITED STATES PATENTS

| | | | |
|---|---|---|---|
| 2,570,775 | 10/1951 | De Baun | 178/69.5 DC |
| 2,944,108 | 7/1960 | Houghton | 178/6.6 P |
| 3,654,387 | 4/1972 | Louth | 178/6.6 P |

*Primary Examiner*—Raymond F. Cardillo, Jr.
*Attorney, Agent, or Firm*—Lewis H. Eslinger, Esq.; Alvin Sinderbrand, Esq.

[57] ABSTRACT

In a video signal recording and reproducing apparatus having a magnetic head or heads for recording and reproducing a video signal on a magnetic tape driven at a variable speed, and in which first and second reference signals are generated with different polarities for the odd and even numbered fields of a video signal, for example, in response to a video signal being reproduced from the tape and an external video signal, respectively; there is provided a servo system which, through controlling the speed at which the tape is driven, achieves frame matching or coincidence of the reproduced and external video signals and also achieves a tracking servo operation, that is, accurate time coincidence of the like-numbered fields of the reproduced and external video signals.

10 Claims, 13 Drawing Figures

VIDEO SIGNAL RECORDING AND REPRODUCING APPARATUS WITH TAPE SPEED CONTROL

Figure 1:
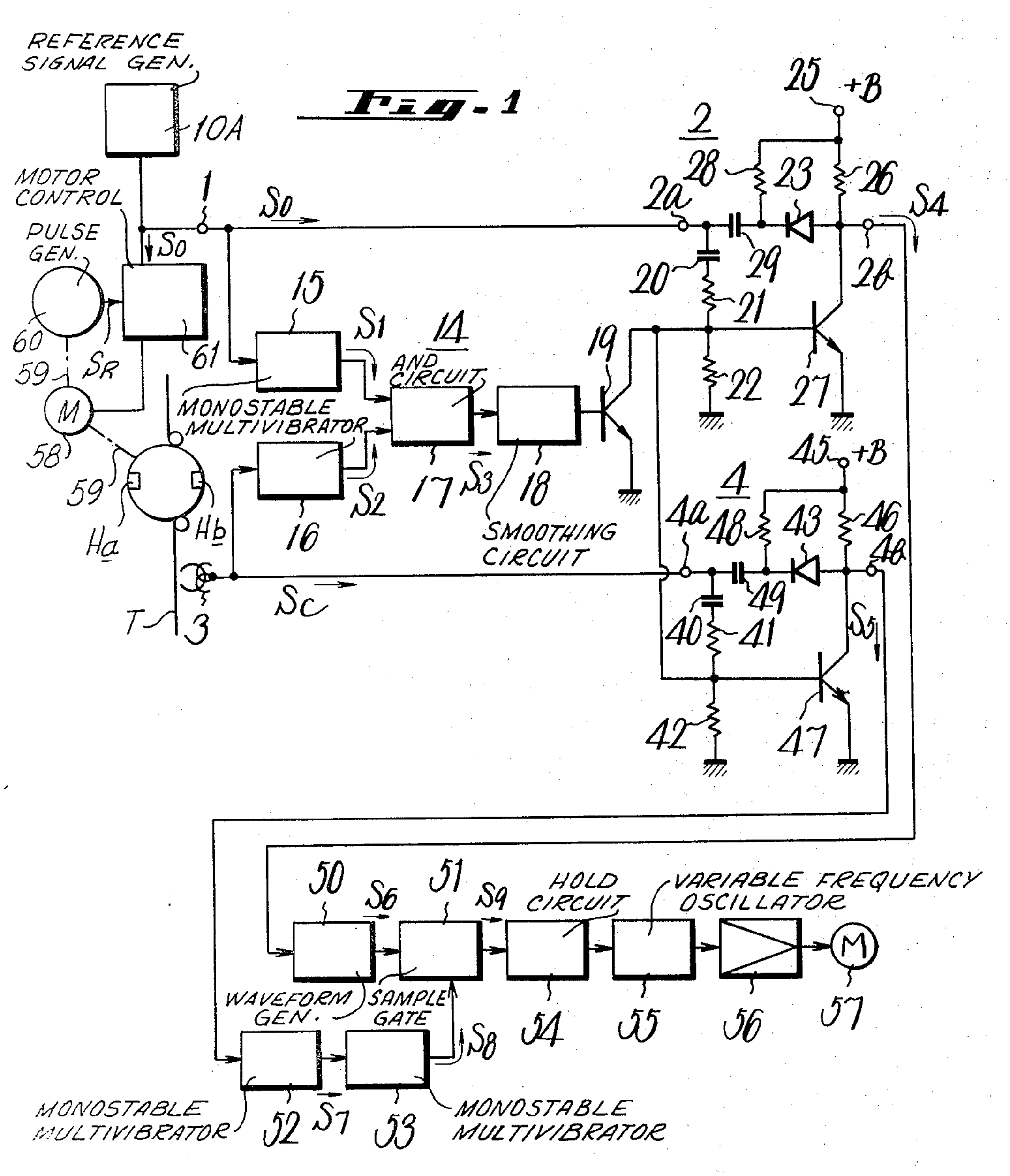

This invention relates generally to video signal recording and reproducing apparatus, and more particularly is directed to an improved servo system for such apparatus.

In a conventional video signal recording and reproducing apparatus, during reproducing operation, a rotary magnetic head is made to accurately scan tracks of a magnetic tape in which a video signal is recorded by comparing a reference signal, which indicates the rotary angular position of the rotary magnetic head, with a control or reference signal reproduced from the magnetic tape to indicate the positions of the tracks thereon, and the compared output is used to control the rotation of a capstan shaft by which the magnetic tape is transported. The foregoing arrangement is called a tracking servo.

There are also cases in which a television receiver is used to monitor a video signal from a television camera and also a video signal from a special video signal reproducing apparatus, or in which it is desired to edit or replace a predetermined section of a video signal being reproduced from a magnetic tape with a new video signal from an external source, for example, from a television camera or from another video signal reproducing apparatus, prior to recording and/or reproducing the combined or edited signals. In either of these cases, it is necessary to achieve coincidence or matching of the frames of the video signals which are being combined, that is, if the video signal from the camera or other external source ends at an even numbered field, the video signal reproduced from a magnetic tape in a video signal reproducing apparatus, and which is to be reproduced or recorded immediately after the external video signal, should commence with an odd numbered field.

In general, when a reproduced video signal is to be obtained from a magnetic tape in a reproducing apparatus in synchronism with an external video signal, a so-called frame pulse, which can discriminate between odd and even numbered fields, is previously recorded on the magnetic tape as a control signal, and the reproduced control signal is compared with a so-called framing pulse which discriminates between the odd and even numbered fields of the external video signal. The compared output then controls a servo system by which the rotational speed of the tape driving capstan is regulated for obtaining frame coincidence or matching, that is, to ensure that each odd or even numbered field of the reproduced video signal is followed by an even or odd numbered field, respectively, of the external video signal. After such frame matching is achieved by the servo system provided therefor, a change-over switch is actuated, usually manually, to effect operation of a separate tracking servo system by which the tape speed is further controlled to obtain exact or accurate time correspondence or tracking between the like-numbered fields of the reproduced and external video signals. Accordingly, it will be apparent that, in the previously existing arrangements, separate servo systems have been provided for achieving frame coincidence or matching and accurate tracking or field coincidence, respectively, with such separate servo systems being rendered operative alternately by means of the change-over switch. Apart from the complexity and relatively high cost associated with the provision of such separate servo systems for frame matching and tracking or field coincidence, respectively, undesirable transient phenomena occur when the change-over switch is manually operated for shifting from one to the other of the servo operations.

It is an object of this invention to provide a video signal recording and reproducing apparatus with an improved servo system.

More specifically, it is an object of the invention to provide a video signal recording and reproducing apparatus in which the servo operation for obtaining matching of the frames of video signals and the servo operation for tracking or field coincidence are carried out by the same servo loop.

A further object is to provide a video signal recording and reproducing apparatus with a servo system which is capable of smoothly and automatically changing over to tracking servo operation after frame matching has been achieved when reproducing a video signal.

Still another object is to provide a video signal recording and reproducing apparatus with a servo system, as aforesaid, which can be produced at relatively low cost.

In accordance with an aspect of this invention, the servo system of a video signal recording and reproducing apparatus produces first and second trigger pulses in response to at least one polarity of first and second reference signals, respectively, which, for example, have different polarities for the odd and even numbered fields of a video signal being reproduced from a tape and of an external video signal, respectively, whereupon waveform signals with sloping portions are generated in response to the first trigger pulses and sampling pulses are generated in response to the second trigger pulses to control the gating or sampling of the waveform signals. The sampled or gated waveform signals are then used to control the speed at which the tape is driven in the video signal recording and reproducing apparatus so as to initially achieve frame matching between the reproduced and external video signals and, thereafter, to achieve accurate field coincidence or tracking of the like-numbered fields of the two video signals.

In a preferred embodiment of the invention, the first and second trigger pulses are produced only for one polarity of the first and second reference signals, respectively, so long as the first and second reference signals of like polarity are outside of a predetermined time relation to each other which corresponds to frame matching of the respective video signals, and, when frame matching is attained, that is, when the reference signals of like polarity are within such predetermined time relation to each other, the first and second trigger pulses are produced for both polarities of the first and second reference signals to ensure the sensitive control of tape speed desired for tracking or maintaining coincidence between the like-numbered fields of the two video signals.

The above, and other objects, features and advantages of the present invention, will be apparent from the following detailed description of an illustrative embodiment which is to be read in conjunction with the accompanying drawings, wherein:

FIG. 1 is a diagrammatic view illustrating a servo system of a video signal recording and reproducing apparatus according to the invention; and FIGS. 2A to 2L, inclusive, are waveform diagrams to which reference will be made in explaining the operation of the servo system of FIG. 1.

Referring to the drawings in detail, and initially to FIG. 1 thereof, it will be seen that a servo system according to this invention is there shown diagrammatically associated only with those parts of a video signal recording and reproducing apparatus necessary for an understanding of the invention, and that other parts of such apparatus, which may be of conventional design, are neither illustrated nor described herein.

Figures 2A, 2B, 2C, 2D, 2E, 2F, 2G, 2H, 2I, 2J, 2K, 2L:
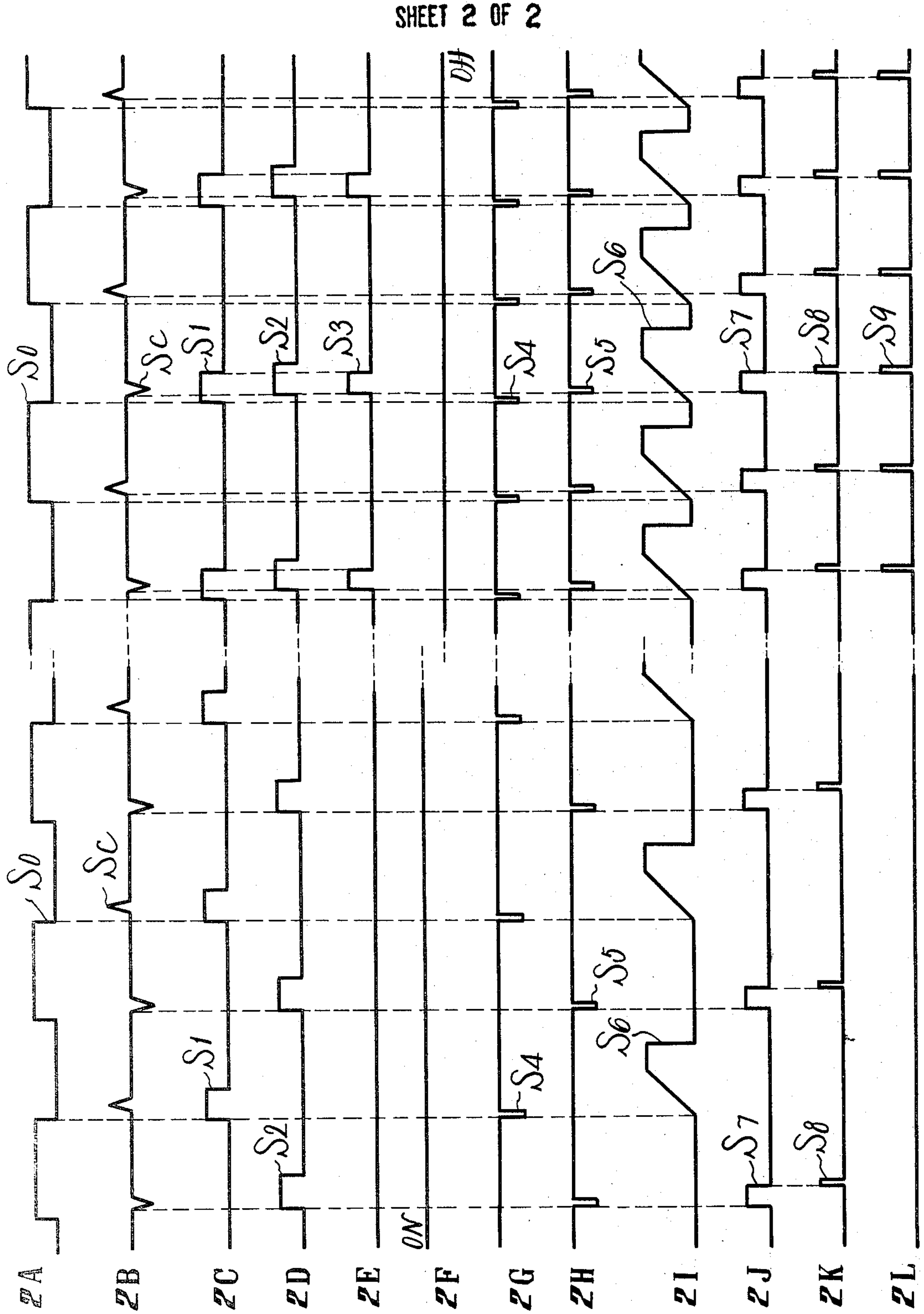

In the servo system of FIG. 1, an input terminal 1 receives a reference signal $S_o$, for example, from a reference signal generator 10A which detects an external video signal, for example, from a television camera or from another video signal reproducing apparatus (not shown), and provides the reference signal $S_o$ with a rectangular waveform which rises at the start of, for example, each odd numbered field of the external video signal and falls at the start of each even numbered field of the external video signal, as shown on FIG. 2A. Thus, it will be apparent that the reference signal $S_o$ has different polarities for the odd and even numbered fields of the external video signal. A magnetic head 3 of the video signal recording and reproducing apparatus reproduces from a magnetic tape T another reference or control signal $S_c$ which is recorded on the magnetic tape with different polarities for odd and even numbered fields of the video signal being simultaneously reproduced from the tape, for example, by rotary heads $H_a$ and $H_b$. As shown on FIG. 2B, the control signal $S_c$ has, for example, a positive polarity for each odd numbered field and a negative polarity for each even numbered field, of the reproduced video signal. The reference signal $S_o$ and/or the reference or control signal $S_c$ may be produced by detecting the respective external and reproduced video signals and distinguishing between the odd and even numbered fields of such video signals on the basis of the different time periods between the vertical synchronizing signal and first horizontal synchronizing signal for the odd and even numbered fields, respectively, and then generating signals with polarities that are characteristic of the detected fields.

The reference signal $S_o$ and the reference or control signal $S_c$ are respectively applied to input terminals *2a* and *4a* of trigger pulse generating circuits 2 and 4. The trigger pulse generating circuits 2 and 4, which are similar to each other, are shown to include transistors 27 and 47, respectively, which have their emitters connected to ground and their collectors connected to output terminals *2b* and *4b* and also connected to power source terminals 25 and 45 through resistors 26 and 46, respectively. The bases of transistors 27 and 47 are connected to input terminals *2a* and *4a* through a capacitor 20 and resistor 21 and through a capacitor 40 and resistor 41, respectively, and to ground through resistors 22 and 42, respectively. Diodes 23 and 43 are connected in series with capacitors 29 and 49, respectively, between input and output terminals *2a* and *2b* and between input and output terminals *4a* and *4b*, respectively, and such diodes 23 and 43 are arranged to conduct in the directions away from the respective output terminals *2b* and *4b*. Resistors 28 and 48 are shown connected between power source terminal 25 and a junction between diode 23 and capacitor 29, and between power source terminal 45 and a junction between diode 43 and capacitor 49, respectively.

It will be apparent that, in the trigger pulse generating circuits 2 and 4 as described above, the diodes 23 and 43 are turned ON to carry the power source potential +B away from the respective output terminals *2b* and *4b*, that is, to provide a reduced voltage trigger pulse at the respective output terminal, in response to each fall of the rectangular waveform of reference signal $S_o$ and in response to each negative polarity of reference or control signal $S_c$, respectively. Further, the transistors 27 and 47, which are turned OFF when the bases thereof are at ground potential, are turned ON only when such bases have increased potentials applied thereto in response to a rise of the rectangular waveform of reference signal $S_o$ and in response to a positive polarity of reference or control signal $S_c$. Whenever transistor 27 or 47 is turned ON, as aforesaid, the respective output terminal *2b* or *4b* is connected to ground therethrough and, accordingly, a reduced voltage trigger pulse is provided at the respective output terminal.

In the servo system according to this invention, as shown, there is further preferably provided a detecting and controlling circuit 14 which detects whether or not the like polarities of reference or control signal $S_c$ and of reference signal $S_o$ are within a predetermined time period with respect to each other, and which controls the trigger pulse generating circuits 2 and 4 with its detected output. In the circuit 14, a monostable multivibrator 15 is triggered by each fall of reference signal $S_o$ to produce a pulse signal $S_1$ with a predetermined pulse width, as shown in FIG. 2C. Similarly, another monostable multivibrator 16 is triggered by control signal $S_c$, for example, its pulse of negative polarity, to deliver therefrom a pulse signal $S_2$ with a predetermined pulse width, as shown in FIG. 2D. Both pulse signals $S_1$ and $S_2$ are applied to an AND circuit 17 which produces an output signal $S_3$, as shown in FIG. 2E, only when the pulse signals $S_1$ and $S_2$ overlap to some extent. The signal $S_3$ is applied to a circuit 18 for producing an output with a suitable polarity which is then applied to the base of a transistor 19 for controlling the circuits 2 and 4. The collector of transistor 19 is connected to the connection point between resistors 21 and 22 of trigger pulse generating circuit 2 and also to the connection point between resistors 41 and 42 of trigger pulse generating circuit 4, and the emitter of transistor 19 is connected to ground. In this illustrated embodiment, overlapping of pulse signals $S_1$ and $S_2$, and the consequent output pulse signal $S_3$ from AND circuit 17 causes circuit 18 to apply a negative DC output to the base of transistor 19, and thereby turns OFF such transistor. On the other hand, when pulse signals $S_1$ and $S_2$ do not overlap, that is, when the like polarities of reference signals $S_o$ and $S_c$ are spaced in time by more than the predetermined time period represented by the pulse width of pulse signal $S_1$, there is no output from AND circuit 17 and circuit 18 applies a positive DC voltage to the base of transistor 19 so as to turn ON the latter. When transistor 19 is turned ON, the ground potential is applied through transistor 19 to the bases of transistors 27 and 47 so that the latter cannot be turned ON by the positive polarities of reference signals $S_o$ and $S_c$, respectively.

The trigger pulses $S_4$ obtained at the output terminal 2b of circuit 2 and shown in FIG. 2G are used to trigger a waveform generator circuit 50 which produces a waveform signal with a sloping portion, for example, a trapezoidal waveform signal $S_6$, as shown in FIG. 2I. The trapezoidal waveform signal $S_6$ is applied to a sampling-gate circuit 51. The trigger pulses $S_5$ obtained at the output terminal 4*b* of circuit 4, and shown in FIG. 2H, are used to trigger another monostable multivibrator circuit 52 which provides a pulse signal $S_7$ with a predetermined pulse width as shown in FIG. 2J. A monostable multivibrator circuit 53 is triggered by the pulse signal $S_7$ at its decline or fall to produce a sampling pulse $S_8$ which has a narrower pulse width than pulse signal $S_7$, as shown in FIG. 2K. The sampling pulse $S_8$ from the monostable multivibrator circuit 53 is applied to sampling-gate circuit 51 to sample-gate the trapezoidal waveform signal $S_6$. Any output signal $S_9$ from sampling-gate circuit 51, for example, as shown in FIG. 2L, is applied to a hold circuit 54 and held therein, that is, hold circuit 54 retains the voltage level of each signal $S_9$ in the period between successive signals. The output from the hold circuit 54 is used to control a variable frequency oscillator 55, and the oscillated output from oscillator 55 is applied through a power amplifier circuit 56 to, for example, an AC motor 57 for controlling the speed of rotation of the motor. The AC motor 57 drives a capstan (not shown) by which the tape is driven or transported. The control arrangement for motor 57 is arranged, in the illustrated embodiment, to provide the minimum or lowest speed rotation of the capstan when there is no sampled output from sampling-gate circuit 51, that is, when a sampling pulse $S_8$ does not correspond in time with a waveform signal $S_6$, and to progressively increase the rotational speed of the capstan, and hence the speed at which the tape is being driven, in accordance with the voltage level of the sampled output signals $S_9$ that are derived from gate circuit 51 when sampling pulses $S_8$ occur during the time periods of waveform signals $S_6$.

The above described servo system according to this invention operates as follows:

If frame matching is not achieved at first and the control signal $S_c$ is not within a predetermined time period with respect to a reference signal $S_o$ of like polarity, as shown at the left-hand portions of FIGS. 2A and 2B, the pulse signals $S_1$ and $S_2$ delivered from monostable multivibrator circuits 15 and 16 are displaced from each other, as shown at the left-hand portions of FIGS. 2C and 2D, so that the AND circuit 17 produces no output signal, as shown on FIG. 2E. As a result, the smoothing circuit 18 produces a positive DC output and the transistor 19 is turned ON, as shown on FIG. 2F. With transistor 19 in its ON state, the bases of transistors 27 and 47 of trigger pulse circuits 2 and 4 are at the ground potential, with the result that, as shown on FIG. 2G, the trigger pulse $S_4$ is obtained at the output terminal 2*b* of circuit 2 only when diode 23 is turned ON at each fall or decline of the reference signal $S_o$, and with the further result that, as shown in FIG. 2H, the trigger pulse $S_5$ is obtained at the output terminal 4*b* of the circuit 4 only when diode 43 is turned ON by each negative pulse of the reference control signal $S_c$. Thus, the first and second trigger pulses $S_4$ and $S_5$ are obtained only at alternate fields, for example, only at even numbered fields. Consequently, the trapezoidal pulse or waveform signal $S_6$ is also obtained from circuit 50 only at even numbered fields, as shown in FIG. 2I, and the pulse signal $S_7$ is similarly obtained from monostable multivibrator circuit 52 only at even numbered fields, as shown in FIG. 2J. Therefore, the sampling pulse $S_8$ is obtained from monostable multivibrator circuit 53 only at even numbered fields, as shown in FIG. 2K. Since the waveform signals $S_6$ are produced only at the even numbered fields of the external video or reference signal $S_o$ and the sampling pulses $S_8$ are also produced only at the even numbered fields of the reproduced video or reference signal $S_c$ when there is an absence of frame matching of the external and reproduced video signals, there are relatively large time gaps between the successive waveform signals $S_6$ and the sampling pulses $S_8$ occur during those time gaps. Accordingly, no output is derived from the gate circuit 51 and, hence, the output from the oscillator 55 is at its minimum frequency to decrease the rotational speed of motor 57 and similarly decrease the speed at which the capstan transports the magnetic tape for achieving the desired frame-matching.

When frame-matching is achieved, that is, when a particular polarity of control signal $S_c$ is positioned within a predetermined time period with respect to the same polarity of reference signal $S_o$, as shown at the right-hand portions of FIGS. 2A and 2B, the pulse signals $S_1$ and $S_2$ from monostable multivibrator circuits 15 and 16 are overlapped partially as shown at the right-hand portions of FIGS. 2C and 2D, so that the AND circuit 17 produces the predetermined output $S_3$, as shown in FIG. 2E, and hence the smoothing circuit 18 produces a negative DC output to turn transistor 19 OFF, as shown in FIG. 2F. With transistor 19 in its OFF state, when the diode 23 is turned ON at the fall or decline of reference signal $S_o$ and also when transistor 27 is turned ON at the rise of reference signal $S_o$, trigger pulses $S_4$ are delivered at the output terminal 2b of circuit 2, as shown in the right-hand portion of FIG. 2G. Similarly, when diode 43 is turned ON at the negative pulse of control signal $S_c$ and also when transistor 47 is turned ON at the positive pulse of control signal $S_c$, trigger pulses $S_5$ are delivered at the output terminal 4b, as shown at the right-hand portion of FIG. 2H. In other words, the trigger pulses $S_4$ and $S_5$ are obtained at every field of the external and reproduced video signals, respectively. Accordingly, in this state, a trapezoidal waveform signal $S_6$, a pulse signal $S_7$ and a sampling pulse $S_8$ are also obtained at every field from the circuit 50, the monostable multivibrator circuit 52 and the monostable multivibrator circuit 53, respectively, as shown on FIGS. 2I, 2J and 2K. Further, with frame-matching achieved, a sampling pulse $S_8$ occurs within the time period of the sloping portion of the respective trapezoidal waveform signal $S_6$. As a result, the sloping portion of the trapezoidal waveform signal $S_6$ is sample-gated in the circuit 51 which then produces the pulse signal $S_9$ as shown in the right-hand portion of FIG. 2L. The oscillator 55 is controlled by the pulse signal $S_9$ through the circuit 54 to produce an output signal at an increased frequency which corresponds to the magnitude of pulse signal $S_9$. Thus, after frame matching is achieved by a relatively rapid change in the speed of of the tape, the rotational speed of motor 57, and hence the speed at which the tape is driven or transported, is controlled in such a manner that each sampling pulse $S_8$ is maintained at a predetermined position within the sloping portion of the respective trapezoidal waveform signal $S_6$, which location or position corresponds to exact coincidence of each field of the video signal reproduced from the tape with the like-numbered field of the external video signal.

As the exact coincidence of the like-numbered fields of the external and reproduced video signals is being attained, as above, the tracking servo operation is simply achieved by comparing the reference signal $S_o$ from generator 10A, that is, the reference signal corresponding to the external video signal, with a reference signal $S_R$ corresponding to the rotational position of the rotary magnetic head or heads $H_a$ and $H_b$ reproducing the video signal from the tape T and, on the basis of the comparison of signals $S_o$ and $S_R$, controlling the speed at which heads $H_a$ and $H_b$ are rotated for ensuring that such heads will accurately scan the oblique tracks in which the video signal is recorded on tape T. For example, in order to carry out the tracking servo operation as above, the heads $H_a$ and $H_b$ may be rotated by a variable speed motor 58 through a shaft 59 which is also connected to a pulse generator 60 producing the reference signal $S_R$ indicating the rotational position of the rotary heads, and the signals $S_o$ and $S_R$ from generators 10A and 60 are compared in a motor controller 61 which correspondingly regulates the speed of motor 58.

With the video signal recording and reproducing apparatus having a servo system according to the invention, the servo operation for frame matching and the tracking servo operation are automatically achieved with a relatively simple construction. It will be apparent that the servo system according to the present invention is free of the drawback of the prior art in which transient phenomena occur when the servo operations are changed by manually operating a switch.

Contrary to the arrangement in the above described embodiment, the control signal $S_c$ may be applied to the trigger pulse generating circuit 2, while the reference signal $S_o$ is applied to the trigger pulse generating circuit 4 to provide the waveform signal $S_6$ in response to the control signal $S_c$ and the sampling pulse $S_8$ in response to the reference signal $S_o$. Further, although it is desirable that the waveform signals $S_6$ have trapezoidal configuration, as shown, such waveform signals may be triangular so as to again present sloping portions which correspond in time with the sampling pulses $S_8$ when exact coincidence of the like-numbered fields of the reproduced and external video signals is achieved.

Having described a specific embodiment of the invention with reference to the accompanying drawings, it is to be understood that the invention is not limited to that precise embodiment, and that various changes and modifications may be effected therein by one skilled in the art without departing from the scope or spirit of the invention.

What is claimed is:

1. In a video signal recording and reproducing apparatus having tape drive means for transporting a tape during the recording and reproducing of a video signal thereon, and means for producing first and second reference signals each of which has different polarities for odd and even numbered fields; a servo system comprising a first trigger pulse generating circuit for producing first trigger pulses in response to one of said polarities of said first reference signal, a second trigger pulse generating circuit for producing second trigger pulses in response to said one of said polarities of said second reference signal, waveform generating means for producing waveform signals with sloping portions in response to said first trigger pulses, sampling pulse generating means for producing sampling pulses in response to said second trigger pulses, sampling gate means receiving said waveform signals and being controlled by said sampling pulses for producing a sampled output with a magnitude that indicates the time relation between saif first and second reference signals, and control means for controlling the speed at which said tape drive means transports the tape in accordance with said sampled output.

2. A video signal recording and reproducing apparatus according to claim 1; in which one of said reference signals is reproduced from said tape during the reproducing of a video signal from the latter, and the other of said reference signals is derived from an external video signal so that said servo system operates to attain frame matching and field coincidence between said reproduced and external video signals.

3. A video signal recording and reproducing apparatus according to claim 2; further comprising rotary head means for reproducing said video signal from the tape, head drive means for rotating said rotary head means, position pulse generating means for generating a third reference signal indicating the rotational position of said rotary head means, and means comparing one of said first and second reference signals with said third reference signal and, on the basis of such comparison, controlling said head drive means to ensure accurate tracking of said rotary head means in respect to the video signal being reproduced from said tape.

4. In a video signal recording and reproducing apparatus having tape drive means for transporting a tape during the recording and reproducing of a video signal thereon, and means for producing first and second reference signals each of which has different polarities for odd and even numbered fields; a servo system comprising first and second trigger pulse generating circuits for emitting first and second trigger pulses in response to said first and second reference signals, respectively, waveform generating means for producing waveform signals with sloping portions in response to said first trigger pulses, sampling pulse generating means for producing sampling pulses in response to said second trigger pulses, sampling gate means receiving said waveform signals and being controlled by said sampling pulses for producing a sampled output upon each time coincidence of one of said sampling pulses with one of said waveform signals, speed control means for controlling the speed at which said tape drive means transports the tape in accordance with said sampled output, and circuit means for detecting the time relation of said first and second reference signals of like polarity and for controlling said first and second trigger pulse generating circuits to emit said first and second trigger pulses only in correspondence to said first and second reference signals of one of said polarities when said first and second reference signals of like polarity are outside a predetermined time relation to each other, and to emit said first and second trigger pulses in correspondence to said first and second reference signals of both of said polarities when said first and second reference signals of like polarity are within said predetermined time relation to each other.

5. A video signal recording and reproducing apparatus according to claim 4; in which one of said reference signals is reproduced from said tape during the reproducing of a video signal from the latter, and the other of said reference signals is derived from an external video signal so that said servo system operates to attain frame matching and field coincidence between said reproduced and external video signals.

6. A video signal recording and reproducing apparatus according to claim 5; further comprising rotary head means for reproducing said video signal from the tape, head drive means for rotating said rotary head means, position pulse generating means for generating a third reference signal indicating the rotational position of said rotary head means, and means comparing one of said first and second reference signals with said third reference signal and, on the basis of such comparison controlling said head drive means to ensure accurate tracking of said rotary head means in respect to the video signal being reproduced from said tape.

7. A video signal recording and reproducing apparatus according to claim 4; in which each of said first and second trigger pulse generating circuits includes an output terminal having a D.C. power source connected thereto, a diode connected with said output terminal and receiving the respective reference signal to provide a trigger pulse at said output terminal in response to said one polarity of said respective reference signal, and a switching transistor also connected with said output terminal and receiving said respective reference signal so as to be operative to provide a trigger pulse at said output terminal in response to the other polarity of said respective reference signal; and in which said circuit means renders operative said transistor of each of said trigger pulse generating circuits only when said first and second reference signals of like polarity are within said predetermined time relation to each other.

8. A video signal recording and reproducing apparatus according to claim 7; in which said diode of each trigger pulse generating circuit is arranged to conduct in the direction away from the respective output terminal in response to said one polarity of said respective reference signal, said transistor has its collector and emitter connected between said respective output terminal and ground to conduct away from said output terminal when said transistor is turned ON, and the base of said transistor receives said respective reference signal so that said transistor is adapted to be turned ON by said other polarity of the respective reference signal; and in which said circuit means grounds said base of the transistor in each of said trigger pulse generating circuits when said first and second reference signals of like polarity are outside said predetermined relation to each other.

9. A video signal receiving and recording apparatus according to claim 8; in which said circuit means includes first and second monostable multivibrator means producing first and second pulse signals in response to said first and second reference signals of like polarity, AND circuit means receiving said first and second pulse signals and producing an output in respone to the overlapping of said first and second pulse signals, and means to ground said base of said transistor of each of said first and second trigger pulse generating circuits except when said output is derived from said AND circuit means.

10. A video signal receiving and recording apparatus according to claim 9; in which said means to ground said base of said transistor of each of the trigger pulse generating circuits includes a control transistor having its collector and emitter connected between ground and said base of said transistor of each of said trigger pulse generating circuits and being turned ON only when there is no output from said AND circuit means.

* * * * *